United States Patent
Feng et al.

(10) Patent No.: US 8,938,071 B2
(45) Date of Patent: Jan. 20, 2015

(54) METHOD FOR UPDATING AIR INTERFACE KEY, CORE NETWORK NODE AND RADIO ACCESS SYSTEM

(75) Inventors: Chengyan Feng, Shenzhen (CN); Lu Gan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/702,842

(22) PCT Filed: Mar. 9, 2011

(86) PCT No.: PCT/CN2011/071628
§ 371 (c)(1),
(2), (4) Date: Dec. 7, 2012

(87) PCT Pub. No.: WO2011/153852
PCT Pub. Date: Dec. 15, 2011

(65) Prior Publication Data
US 2013/0077785 A1    Mar. 28, 2013

(30) Foreign Application Priority Data
Jun. 7, 2010    (CN) .......................... 2010 1 0300885

(51) Int. Cl.
*H04L 29/06* (2006.01)
*H04L 9/08* (2006.01)
(Continued)

(52) U.S. Cl.
CPC ............. *H04L 9/0816* (2013.01); *H04W 12/04* (2013.01); *H04W 36/0038* (2013.01); *H04W 12/08* (2013.01)
USPC ........................................... 380/44; 455/436

(58) Field of Classification Search
CPC ..... H04L 9/0816; H04W 12/08; H04W 36/00
USPC .............................................................. 380/44
See application file for complete search history.

(56) References Cited

U.S. PATENT DOCUMENTS

2004/0039910 A1*   2/2004   Isokangas et al. ............ 713/171
2008/0240439 A1*  10/2008   Mukherjee et al. .......... 380/272
(Continued)

FOREIGN PATENT DOCUMENTS

| CN | 101583130 A | 11/2009 |
| CN | 101715188 A | 5/2010 |

(Continued)

OTHER PUBLICATIONS

ZTE Corporation: "Key change during SRNS Relocation".
(Continued)

*Primary Examiner* — Hadi Armouche
*Assistant Examiner* — Bryan Wright
(74) *Attorney, Agent, or Firm* — Porter Wright Morris & Arthur LLP

(57) ABSTRACT

The disclosure discloses a method for updating an air interface key, a core network node and a radio access system, wherein the method for updating an air interface key comprises: a core network node receives a relocation complete indication message from a target RNC (S502), the relocation complete indication message is configured to indicate the successful relocation of User Equipment (UE) from a source RNC to the target RNC; the core network node uses the saved traditional key and the current enhanced key to calculate a next hop enhanced key (S504); the core network node sends the next hop enhanced key to the target RNC (S506). Through the disclosure, the forward security of users is guaranteed effectively, thus the communication security of the radio access system is improved overall.

17 Claims, 8 Drawing Sheets

(51) Int. Cl.
*H04W 12/04* (2009.01)
*H04W 36/00* (2009.01)
*H04W 12/08* (2009.01)

(56) References Cited

U.S. PATENT DOCUMENTS

2010/0130207 A1* 5/2010 Wu ............................ 455/436
2010/0220862 A1* 9/2010 Geary et al. ................ 380/272
2012/0077501 A1* 3/2012 Zhang et al. ............... 455/436
2013/0078956 A1* 3/2013 Feng et al. .................. 455/411

FOREIGN PATENT DOCUMENTS

| CN | 101835151 A | 9/2010 |
| CN | 101841810 A | 9/2010 |
| CN | 101867924 A | 10/2010 |
| EP | 1770917 A | 4/2007 |

OTHER PUBLICATIONS

Ericsson, etal: "Keeping track of updated peers".

* cited by examiner

METHOD FOR UPDATING AIR INTERFACE KEY, CORE NETWORK NODE AND RADIO ACCESS SYSTEM

FIELD OF THE INVENTION

The disclosure relates to the field of radio communication, and in particular to a method for updating an air interface key during Serving Radio Network Controller (SRNC) relocation in a radio communication system, a core network node and a radio access system.

BACKGROUND OF THE INVENTION

The 3rd Generation Partnership Project (3GPP) employs Orthogonal Frequency Division Multiplexing (shorted for OFDM) and Multiple-Input Multiple-Output (shorted for MIMO) technologies in Release7 to complete the future evolution path HSPA+ of High Speed Downlink Packet Access (HSDPA) and High Speed Uplink Packet Access (HSUPA). The HSPA+ is an enhancement technology of the 3GPP HSPA (including HSDPA and HSUPA). The HSPA+ provides a way of smooth evolution from HSPA to Long Term Evolution (LTE) with low complexity and low cost for HSPA operators.

Compared with HSPA, in HSPA+ system architecture, functions of the Radio Network Controller (shorted for RNC) are given to the Node B to form completely flat radio access network architecture, as shown in FIG. 1. In this case, the Node B integrating all functions of the RNC is called the evolved HSPA Node B, or shorted for enhanced Node B (Node B+). SGSN+ is the upgraded Service General Packet Radio System (GPRS) Support Node (SGSN) which can support the functions of the HSPA+. ME+ is the user terminal equipment which can support the functions of the HSPA+. The evolved HSPA system can use the air interface of the version of 3GPP Rel-5 and later, without having any modification for HSPA services of the air interface. After this solution is employed, each Node B+ becomes a node equivalent to the RNC, and has an Iu-PS interface to be able to directly connect with a PS Core Network (CN) (as SGSN and GGSN shown in FIG. 1). The Iu-PS user plane ends at the SGSN. In the above, if the network supports a direct tunnel function, the Iu-PS user plane may also end at the Gateway GPRS Support Node (GGSN). Communication between the evolved HSPA Nodes B is performed through an Iur interface. Node B+ has the capability of independent networking, and supports complete mobility functions, including inter-system and intra-system handoff.

As the network is flattened, the user plane data may reach the GGSN directly without passing through the RNC. It means that the ciphering and the integrity protection function of the user plane must be moved forward to the Node B+. At present, an HSPA+ security key hierarchy structure is proposed by Ericsson, as shown in FIG. 2. In the above, the definition of Key (K, the root key), Ciphering Key (CK) and Integrity Key (IK) is completely consistent to those in a Universal Mobile Telecommunications System (UMTS). That is, K is a key saved in the Authentication. Center (AuC) and the Universal Subscriber Identity Module (USIM). CK and IK are a ciphering key and an integrity key calculated from K when Authentication and Key Agreement (AKA) is performed between the User Equipment and the Home Subscriber Server (HSS). They are called the traditional keys. In the UMTS, the RNC uses the traditional air interface keys CK and IK to perform data ciphering and integrity protection. As functions of the RNC are all given to the Node B+ in the HSPA+ architecture, both ciphering and deciphering have to be performed at the Node B+. But, the Node B+ is in an insecure environment with low security. Therefore, a key hierarchy similar to the Evolved Universal terrestrial Radio Access Network (E-UTRAN), i.e., the UTRAN key hierarchy, is introduced to the HSPA+. In the UTRAN key hierarchy structure, the air interface key $CK_U$ and $IK_U$ are the newly introduced keys for the HSPA+, which are derived of the traditional keys CK and IK, and are called the enhanced keys, wherein the enhanced key $CK_U$ is used for encrypting the user plane data and the control plane signaling, and the enhanced key $IK_U$ is used for performing integrity protection for the control plane signaling.

In a WCDMA system, the concept of SRNC/Drift RNC (DRNC) is produced due to the introduction of the Iur interface. Both SRNC and DRNC are logic concepts for certain specific User Equipment (UE). Simply, for a certain UE, the RNC which is directly connected with the Core Network (CN) and controls all the resources of the UE is called the SRNC of the UE; and the RNC which is not connected with the CN and just provides resources for the UE is called the DRNC of the UE. The UE in connected status must have but only one SRNC, and may have 0 or multiple DRNCs.

In a WCDMA system, SRNC relocation is a process in which the SRNC of the UE changes from one RNC to another RNC. According to different positions of the UE before and after the relocation, there can be two types of relocation: static relocation and concomitant relocation.

The condition for static relocation is that the UE accesses but only from one DRNC. As the relocation process needs no participation of the UE, it is also called the UE not-involved relocation. After the relocation, the connection of the Iur interface is released, the Iu interface relocates, and the old DRNC becomes to the SRNC, as shown in FIG. 3. Static relocation is caused by soft handoff. Due to the Iur interface, the relocation starts after all radio links are linked to the DRNC.

Concomitant relocation is a process in which the UE switches to a target RNC from the SRNC by hard handoff and the Iu interface changes simultaneously, as shown in FIG. 4. As the relocation process needs the participation of the UE, it is also called the UE involved relocation.

In the HSPA+, as the Node B+ is in a physically insecure environment, it is easy to suffer hostile attack. The security is under threat. While in the traditional UMTS, before and after the SRNC relocation, the Ciphering key CK and the integrity key IK are identical. This may cause that: on one hand, after a certain base station is breached by an attacker, the attacker may derive the security key of the next hop target base station; on the other hand, if the key is leaked or illegally obtained by an attacker, the attacker may monitor communication of the user all the time, and may also counterfeit data transmission between the user and the network; both situations will cause that the communication security of the user cannot be guaranteed.

SUMMARY OF THE INVENTION

The disclosure provides a method for updating an air interface key, a core network node and a radio access system, to solve the problem in the related art that the communication security of the user cannot be guaranteed as keys are identical during the SRNC relocation.

According to one aspect of the disclosure, a method for updating an air interface key is provided, comprising: a core network node receiving a relocation complete indication message from a target Radio Network Controller (RNC), wherein the relocation complete indication message is configured to indicate successful relocation of a User Equipment (UE) from a source RNC to the target RNC; using a saved traditional key and a current enhanced key to calculate a next hop enhanced key; and sending the next hop enhanced key to the target RNC.

Preferably, the traditional key comprises a traditional integrity key IK and/or a traditional ciphering key CK, and the enhanced key comprises an enhanced integrity key $IK_U$ and/or an enhanced ciphering key $CK_U$.

Preferably, a network Next hop Chaining Counter (NCC) is set in the core network node to count number of times that the core network node calculates the next hop enhanced key.

Preferably, before the step that the core network node receives the relocation complete indication message from the target RNC, the method further comprises: the source RNC sending a relocation demand message to the core network node, wherein the relocation demand message comprises a next hop $CK_U$ and/or a next hop $IK_U$ sent by the source RNC; and the core network node receiving the relocation demand message and sending a relocation request message to the target RNC, wherein the relocation request message comprises the next hop $CK_U$ and/or the next hop $IK_U$ sent by the source RNC.

Preferably, both the relocation demand message and the relocation request message include information indicated by the network NCC.

Preferably, the step that the source RNC sends the relocation demand message to the core network node comprises: the source RNC putting the next hop $IK_U$ in an IK field of the relocation demand message, and/or putting the next hop $CK_U$ in a CK field of the relocation demand message, and sending them/it to the core network node; and the step that the core network node sends the relocation request message to the target RNC comprises: the core network node putting the next hop $IK_U$ sent by the source RNC in an IK field of the relocation request message, and/or putting the next hop $CK_U$ sent by the source RNC in a CK field of the relocation request message, and sending them/it to the target RNC.

Preferably, before the step that the core network node receives the relocation complete indication message from the target RNC, the method further comprises: the source RNC sending an enhanced relocation request message to the target RNC, wherein the enhanced relocation request message comprises the next hop $CK_U$ and/or the next hop $IK_U$ of the source RNC.

Preferably, the step that the source RNC sends the enhanced relocation request message to the target RNC comprises: the source RNC putting the next hop $IK_U$ in an IK field of the enhanced relocation request message, and/or putting the next hop $CK_U$ in a CK field of the enhanced relocation request message, and sending them/it to the target RNC.

Preferably, after the step that the core network node sends the relocation request message/the enhanced relocation request message to the target RNC, the method further comprises: if the target RNC does not support an enhanced security mode, the content in the CK field of the relocation request message/the enhanced relocation request message is taken as the CK and the content in the IK field of the relocation request message/the enhanced relocation request message is taken as the IK; and if the target RNC supports the enhanced safe mode, the content in the CK field of the relocation request message/the enhanced relocation request message is taken as the $CK_U$ and the content in the IK field of the relocation request message/the enhanced relocation request message is taken as the $IK_U$.

Preferably, after the step that the core network node sends the relocation request message to the target RNC, the method further comprises: the core network node receiving a relocation request acknowledge message from the target RNC and sending a relocation command message to the source RNC, wherein the relocation command message comprises information indicated by the network NCC; and the source RNC receiving the relocation command message and sending a relocation message to the UE, wherein the relocation message comprises information indicated by the network NCC.

Preferably, after the step that the source RNC receives the relocation command message and sends the relocation message to the UE, the method further comprises: the UE receiving the relocation message, and judging whether a terminal NCC corresponding to a currently activated enhanced key is equal to the network NCC; if yes, the UE using the $IK_U$ and/or the $CK_U$ which is saved in advance and is corresponding to the terminal NCC; and if not, the UE calculating the $IK_U$ and/or the $CK_U$ and progressively increasing the corresponding terminal NCC, till the terminal NCC is equal to the network NCC.

Preferably, the method for updating an air interface key further comprises: the core network node calculating the current enhanced key according to the saved traditional key, when the UE is attached to the network for a first time, or when the UE switches to the connected mode from the idle mode, or when the UE moves into the Universal Terrestrial Radio Access Network (UTRAN) from the Evolved Universal Terrestrial Radio Access Network (E-UTRAN) or Global System for Mobile Communication (GSM), or when the UE moves into the enhanced UTRAN from the traditional UTRAN; and the core network node sending the current enhanced key and/or a calculated initial next hop enhanced key to a serving RNC.

Preferably, the initial next hop enhanced key is calculated by the core network node according to the saved traditional key and the calculated current enhanced key through formula of: $(IK_U, CK_U) = F1 (IK \| CK, Parameter)$; $(IK'_U, CK'_U) = F2 (IK \| CK, IK_U \| CK_U)$; wherein F1 and F2 are key functions, IK is a traditional integrity key, CK is a traditional ciphering key, $IK_U$ is a current enhanced integrity key, $CK_U$ is a current enhanced ciphering key, $IK'_U$ is an initial next hop enhanced integrity key, $CK'_U$ is an initial next hop enhanced ciphering key, symbol "$\|$" represents a concatenation operation, and Parameter is a parameter.

Preferably, after the step that the core network node sends the current enhanced key and/or the calculated initial next hop enhanced key to the serving RNC, the method further comprises: the serving RNC receiving and saving the current enhanced key and/or the calculated initial next hop enhanced key, and sending a security mode command message to the UE; and the UE receiving the security mode command message and using the saved traditional key to calculate the enhanced key.

Preferably, after the step that the UE receives the security mode command message and uses the saved traditional key to calculate the enhanced key, the method further comprises: the UE using the traditional key and the enhanced key to calculate the next hop enhanced key.

According to another aspect of the disclosure, a core network node is provided, comprising: a receiving module, configured to receive a relocation complete indication message from a target Radio Network Controller (RNC), wherein the relocation complete indication message is configured to indicate successful relocation of a User Equipment (UE) from a source RNC to the target RNC; a calculation module, configured to, after the receiving module receives the relocation complete indication message, use a saved traditional key and a current enhanced key to calculate a next hop enhanced key; and a sending module, configured to send the next hop enhanced key to the target RNC.

Preferably, the core network node further comprises: a network Next hop Chaining Counter (NCC), configured to count number of times that the core network node calculates the next hop enhanced key.

Preferably, the receiving module is further configured to, before receiving the relocation complete indication message from the target RNC, receive a relocation demand message sent by the source RNC, wherein the relocation demand message comprises a next hop $CK_U$ and/or a next hop $IK_U$ of the source RNC; and the sending module is further configured to send a relocation request message to the target RNC, wherein the relocation request message comprises the next hop $CK_U$ and/or the next hop $IK_U$ sent by the source RNC.

According to still another aspect of the disclosure, a radio access system is provided, comprising a source Radio Network Controller (RNC), a target RNC, a core network node and a User Equipment (UE), wherein the source RNC is configured to send a relocation demand message to the core network node, wherein the relocation demand message carries a next hop enhanced key of the source RNC; receive a relocation command from the core network node; and send a relocation message to the UE; the target RNC is configured to receive a relocation request message sent by the core network node, wherein the relocation request message carries the next hop enhanced key sent by the source RNC; send a relocation complete indication message to the core network node; and receive a relocation complete acknowledge message from the core network node, wherein the relocation complete acknowledge message comprises a next hop enhanced key of the target RNC; the core network node is configured to receive the relocation complete indication message from the target RNC, and calculate a next hop enhanced key and send the next hop enhanced key to the target RNC by the relocation complete acknowledge message; and the UE is configured to synchronize enhanced key of the UE according to the relocation message sent by the source RNC.

Preferably, a receiving module, configured to receive the relocation complete indication message from the target RNC, wherein the relocation complete indication message is configured to indicate successful relocation of the UE from the source RNC to the target RNC; a calculation module, configured to, after the receiving module receives the relocation complete indication message, use a saved traditional key and a current enhanced key to calculate the next hop enhanced key; and a sending module, configured to send the next hop enhanced key to the target RNC.

Preferably, the core network node of the radio access system further comprises: a network Next hop Chaining Counter (NCC), configured to count number of times that the core network node calculates the next hop enhanced key.

Preferably, the UE of the radio access system comprises: a terminal NCC, configured to count number of times that the UE calculates the next hop enhanced key.

Preferably, the UE of the radio access system further comprises: a judging module, configured to judge whether the terminal NCC is equal to the network NCC; a positive result module, configured to, if the result of the judgment of the judging module is yes, use a $CK_U$ and/or a $IK_U$ which is saved in advance and is corresponding to the terminal NCC; and a negative result module, configured to, if the result of the judgment of the judging module is no, calculate the $CK_U$ and/or the $IK_U$, and progressively increase the corresponding terminal NCC till the terminal NCC is equal to the network NCC.

Through the disclosure, when the terminal is initially attached or after the SRNC relocation is completed successfully, the core network node of the radio access system calculates and generates next hop enhanced keys $IK_U$ and $CK_U$ according to traditional keys IK and CK at the core network node, and sends the next hop enhanced keys to the target RNC for later use in the next SRNC relocation. Thus, the source RNC and the target RNC use different enhanced keys $IK_U$ and $CK_U$. Furthermore, as the enhanced air interface key used by the next hop target RNC is derived by the core network, after twice SRNC relocations, the source RNC is unable to know the air interface key of the target RNC of two hops later. Therefore, even if a certain base station is breached or illegally controlled by an attacker, after twice SRNC relocations, it can still guarantee the secure communication of the user, and the forward security of the user is guaranteed. Thus the communication security of the radio access system is improved overall.

BRIEF DESCRIPTION OF THE DRAWINGS

Drawings described herein are provided for further understanding of the disclosure and form one part of the application. The exemplary embodiments of the disclosure and descriptions thereof are used for explaining the disclosure and do not constitute undue limitation for the disclosure. In the drawings.

DETAILED DESCRIPTION OF THE EMBODIMENTS

The disclosure will be described in detail below with reference to drawings and in conjunction with embodiments. It should be noted that embodiments in the application and features in the embodiments may be combined with each other if not conflicted.

Figure 1:
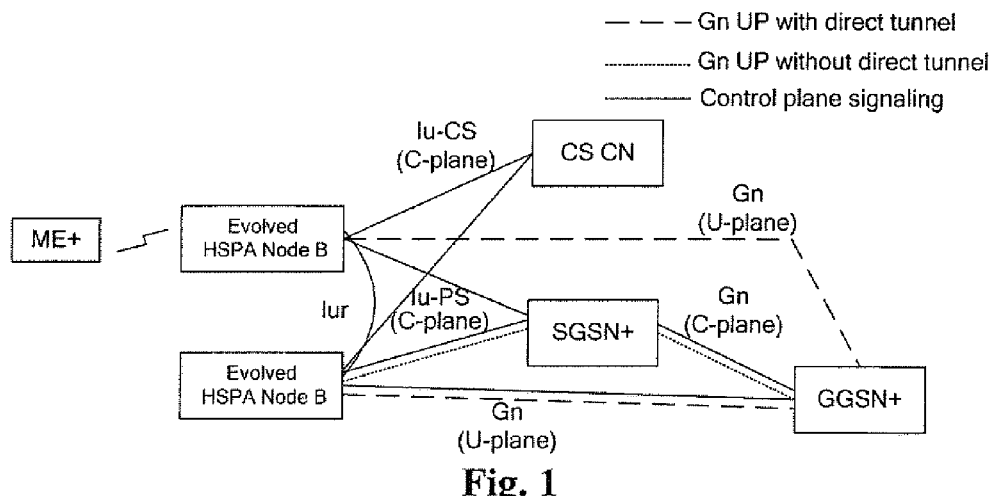
FIG. 1 shows an architecture diagram of a radio access network employing the HSPA+ technology in the related technologies.
Figure 2:
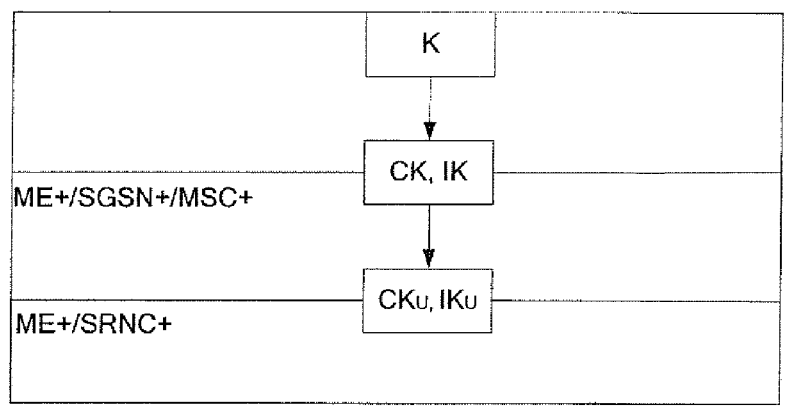
FIG. 2 shows a diagram of an HSPA+ security key hierarchy structure in the related technologies.
Figure 3:
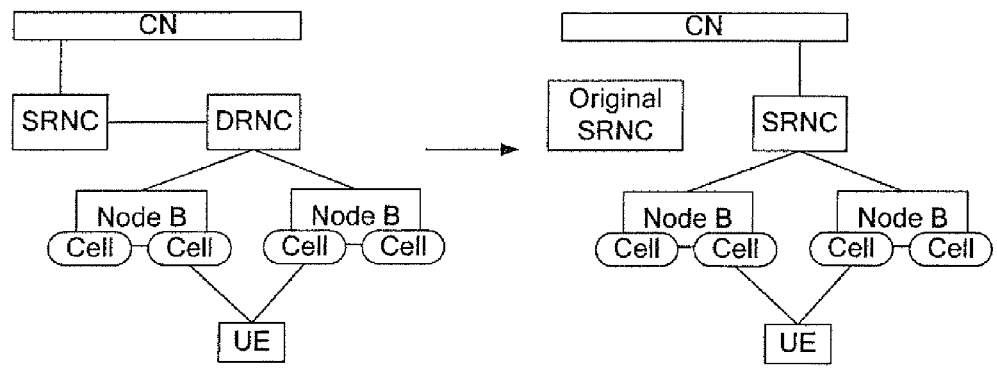
FIG. 3 shows a diagram of an SRNC static relocation in the related technologies.
Figure 4:
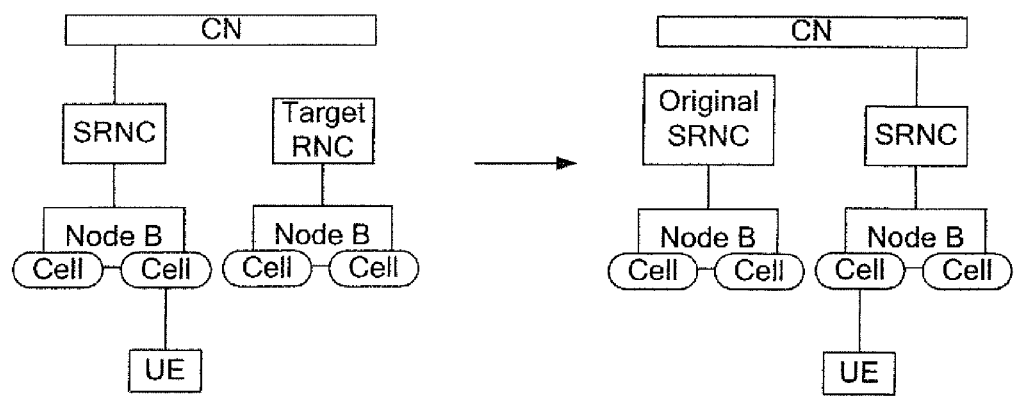
FIG. 4 shows the diagram of an SRNC concomitant relocation in the related technologies.

The SRNC relocation involved in a radio access system employing the UTRAN, involves a core network node (SGSN+ or MSC+), a source RNC (i.e., SRNC), a target RNC, a Node B and UE, as shown in FIG. 3 and FIG. 4. In a radio access system employing the HSPA+, Node B+ may be regarded as a combination of the Node B and the RNC, which are one physical entity but are two different logic entities. It should be noted that a Node B+ supporting the enhanced security key hierarchy in the embodiment of the disclosure may also be equivalent to an updated RNC (RNC+) in the UMTS. The SRNC in the embodiment of the disclosure can be equivalent to the source RNC (source Node B+). The DRNC in the embodiment of the disclosure can be equivalent to the target RNC (target Node B+).

Figure 5:
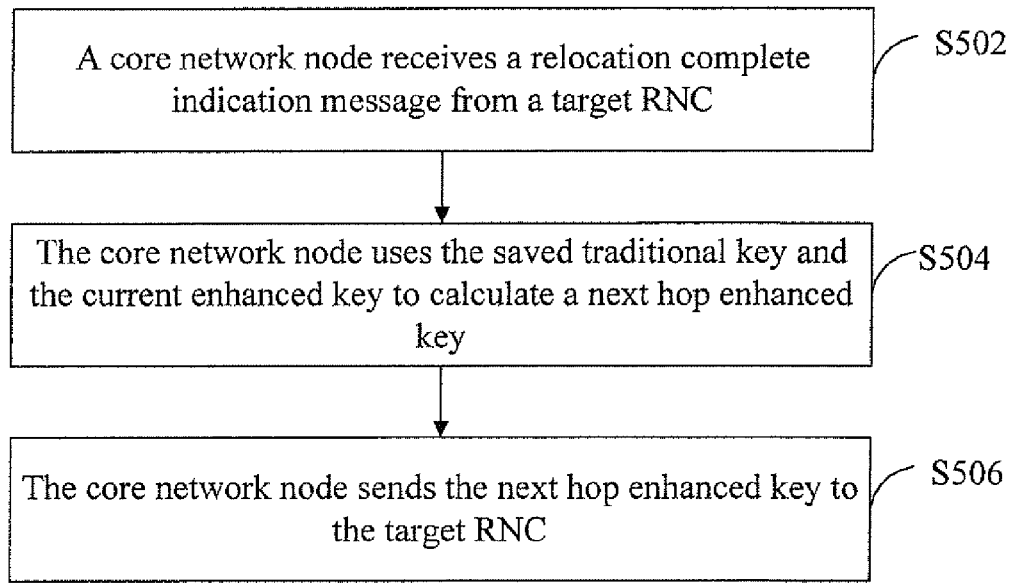
FIG. 5 shows a step flowchart of a method for updating an air interface key according to an embodiment of the disclosure.

With reference to FIG. 5, a step flowchart of a method for updating an air interface key according to an embodiment of the disclosure is shown, comprising the following steps.

Step S502: A core network node receives a relocation complete indication message from a target RNC;

wherein the relocation complete indication message indicates that the UE successfully relocates from a source RNC to the target RNC.

Step S504: The core network node uses the saved traditional key and the current enhanced key to calculate a next hop enhanced key;

wherein the traditional key comprises the traditional integrity key IK and/or the traditional ciphering key CK, and the enhanced key comprises the enhanced integrity key $IK_U$ and/or the enhanced ciphering key $CK_U$.

The core network node uses the traditional key IK and/or CK saved in the core network node and the currently used enhanced key $IK_U$ and/or $CK_U$ to calculate a next hop enhanced key $IK_U$ and/or $CK_U$ through a key generation function. To distinguish from the currently used enhanced key $IK_U$ and/or $CK_U$, the next hop enhanced keys are called $IK'_U$ and $CK'_U$ in the embodiment of the disclosure.

Step S506: The core network node sends the next hop enhanced key to the target RNC.

In this step, the core network node sends $IK'_U$ and $CK'_U$ to the target RNC for saving, so that the target RNC uses them in the next SRNC relocation.

In related technologies of the traditional UTRAN, in the SRNC relocation, the key before and after the relocation is not changed. However, in the embodiment, the core network node sends the updated next hop enhanced keys to the target RNC, so that the UE uses them in the next SRNC relocation. Thus the source RNC and the target RNC use different keys. Furthermore, after twice SRNC relocations, the source RNC is unable to know the air interface key of the target RNC of two hops later. Hence, the forward security of the communication of the user is guaranteed, and communication security of the radio access system is improved.

During the calculation process of the next hop enhanced keys $IK'_U$ and $CK'_U$, besides traditional keys IK and CK and enhanced keys $IK_U$ and $CK_U$, one or any combination of the following parameters may also be used: the Sequence Number (SQN), Anonymity key (AK), the user identifier (such as International Mobile Subscriber Identity (MI), and Temporary Mobile Subscriber Identity (TMSI)), the serving network identifier and the core network node type.

The embodiment of the disclosure provides the following key functions for calculating various security keys, including key functions for calculating security keys during the initialization and in the SRNC relocation. In the following key functions, parameters within the brackets can be in any sequence, and some of the parameters may be combined in the form of concatenation or other forms.

During the initialization: $(IK_U, CK_U)$=F1 (IK||CK, Parameter);

$(IK'_U, CK'_U)$=F2 (IK||CK, $IK_U$||$CK_U$); and in the SRNC relocation: $(IK'_U, CK'_U)$=F2 (IK||CK, $IK'_{U\_old}$||$CK'_{U\_old}$)

or, $IK_U$=$IK'_{U\_old}$, $CK_U$=$IK'_{U\_old}$, $(IK'_U, CK'_U)$=F2 (IK||CK, $IK_U$||$CK_U$);

wherein, F1 and F2 are different or identical key functions, for example, the KDF function defined in the 3GPP, $IK_U$ is the enhanced integrity key, $CK_U$ is the enhanced ciphering key, $IK'_U$ is the next hop enhanced integrity key, $CK'_U$ is the next hop enhanced ciphering key, $IK'_{U\_old}$ is the current enhanced integrity key, $CK'_{U\_old}$ is the current enhanced ciphering key, symbol || is a concatenation, and Parameter is a parameter. When the UE enters the connected status from the idle status, it is necessary to ensure that the Parameter used every time is different.

All embodiments of the disclosure may employ the above key functions. Of course, those skilled in the art may employ other proper key calculation methods according to actual situations. The disclosure makes no limit on this feature.

Figure 6:
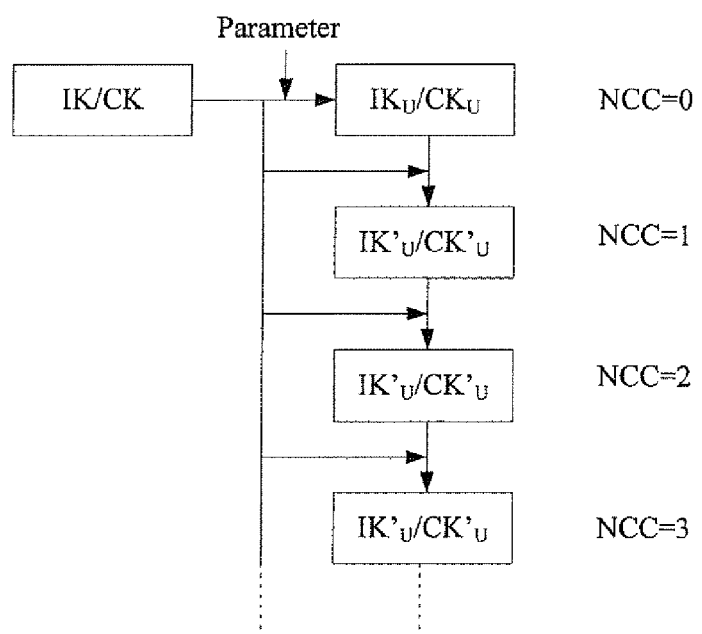
FIG. 6 shows the diagram of a key chain for updating an air interface key according to an embodiment of the disclosure.

During the initial attachment, or when the UE returns to the activated status from the idle state, or when the UE moves into the Universal Terrestrial Radio Access Network (UTRAN) from the Evolved Universal Terrestrial Radio Access Network (E-UTRAN) or Global System for Mobile Communication (GSM), or when the UE moves into the enhanced UTRAN from the traditional UTRAN (not support HSPA+ security), the processing of the next hop enhanced keys by the core network node generally comprises two situations. One is that the core network node sends the next hop enhanced key $IK'_U$/$CK'_U$ to the SRNC during the initialization, the source RNC sends the next hop enhanced key to the target RNC in the first SRNC relocation, and the target RNC and the UE respectively use the next hop enhanced key as $IK_U$ and $CK_U$. The other one is that the core network node does not send the next hop enhanced key to the SRNC during the initialization, the source RNC sends the current enhanced key $IK_U$/$CK_U$ to the target RNC in the first SRNC relocation, and the target RNC and the UE respectively use the keys $IK_U$ and $CK_U$ to perform security protection for communication. In the second SRNC relocation, the target RNC and the UE then respectively use the next hop enhanced key $IK'_U$/$CK'_U$. The key chain for updating the air interface key is shown in FIG. 6, wherein the NCC is a next hop chaining counter, and Parameter is a parameter.

Figure 7:
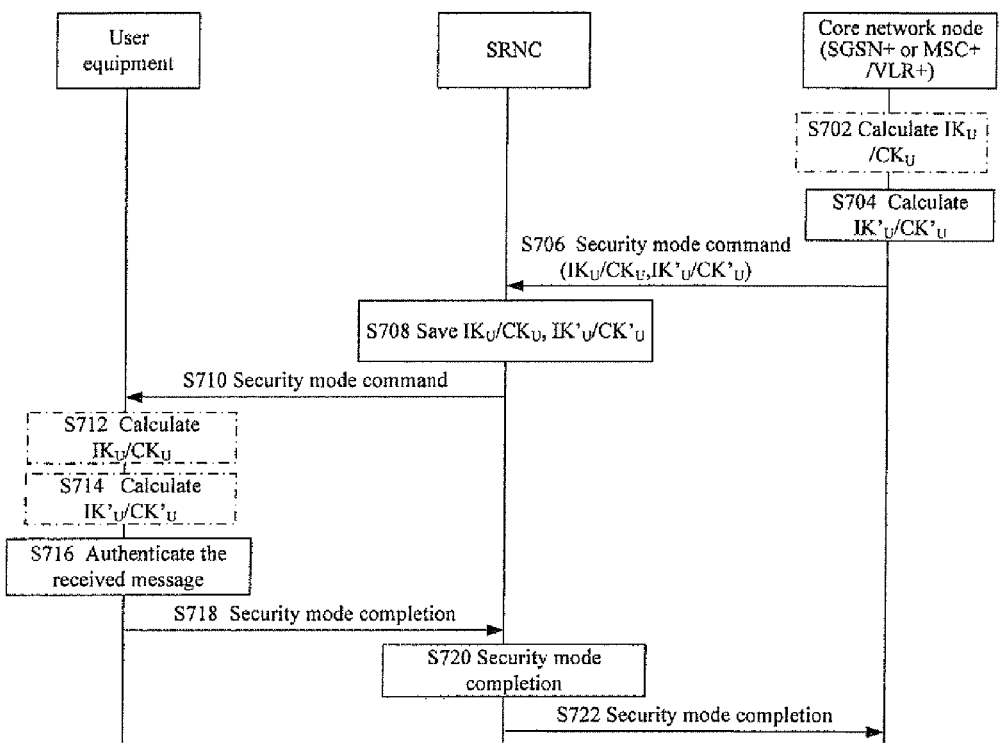
FIG. 7 shows a flowchart of an initial air interface key establishment process according to an embodiment of the disclosure.

With reference to FIG. 7, a flowchart of an initial air interface key establishment process according to an embodiment of the disclosure is shown, comprising the following steps.

Step S702: The core network node (for example, SGSN+ or MSC+) calculates the enhanced key $IK_U$/$CK_U$ according to the saved IK and CK.

The condition for triggering this step is: when the UE is attached to the network for the first time, or when the UE switches to the connected mode from the idle mode, or when the UE moves into the UTRAN from the E-UTRAN or GSM, or when the UE moves into the enhanced UTRAN from the traditional UTRAN (not support HSPA+ security).

For the security mode command flow triggered when the UE switches to the connected mode from the idle mode, if a valid enhanced key $IK_U$/$CK_U$ is still saved in the SGSN+ or MSC/VLR, this step is optional. The saved enhanced key may be directly used, and no recalculation is needed.

Step S704: The core network node calculates the next hop enhanced key $IK'_U/CK'_U$ according to the traditional integrity key IK, the ciphering key CK and the enhanced keys $IK_U$ and $CK_U$ calculated in step S702.

Step S706: The core network node sends a security mode command message to the SRNC, wherein the security mode command message carries the enhanced keys $IK_U$ and $CK_U$ and/or the next hop enhanced key $IK'_U/CK'_U$.

In the above, the security mode command message may also carry one or any combination of the following parameters: the UE security capability, the key set identifier, the selected integrity algorithm set and the ciphering algorithm set.

In the above, the sending of the next hop enhanced key $IK'_U/CK'_U$ is optional. That is, when the initial connection is established, it can be that only the enhanced key $IK_U/CK_U$, instead of the next hop enhanced key $IK'_U/CK'_U$, is sent.

Step S708: After receiving the security mode command message, the SRNC saves the received enhanced keys $IK_U$ and $CK_U$ and/or the next hop enhanced key $IK'_U/CK'_U$.

Step S710: The SRNC sends a security mode command message to the UE.

This security mode command message may carry a message authentication code calculated by $IK_U$, and may also carry one or any combination of the following parameters: the UE security capability, the key set identifier, the selected integrity algorithm set and the ciphering algorithm set.

Step S712: After receiving the security mode command message, the UE saves the ciphering algorithm and the integrity algorithm, and calculates the enhanced keys $IK_U$ and $CK_U$ according to the traditional ciphering key CK and the traditional integrity key IK generated in the AKA process (this process may also occur before the security mode command message is received). Then, the UE and the SRNC share the same enhanced integrity key $IK_U$ and/or enhanced ciphering key $CK_U$, and the communication between the UE and the SRNC may be protected by the above keys.

In this step, for the security mode command flow triggered when the UE switches to the connected mode from the idle mode, if valid enhanced keys $IK_U$ and $CK_U$ are still saved in the UE, the enhanced keys $IK_U$ and $CK_U$ may be directly used, and no recalculation is needed.

Step S714: The UE calculates the next hop enhanced key $IK'_U/CK'_U$ according to the traditional ciphering key CK, the integrity key IK, and the enhanced keys $IK_U$ and $CK_U$ calculated in step S712.

This step is an optional step. That is, it can be that the UE does not calculate the next hop enhanced key at initialization, and instead, the UE may calculate the next hop enhanced key when it is needed.

Step S716: The UE uses $IK_U$ to authenticate the received security mode command message.

Step S718: if the authentication of the security mode command message is successful, the UE sends a security mode complete message to the SRNC, wherein the security mode complete message carries the message authentication code calculated by $IK_U$, or the UE may also use the $CK_U$ to encrypt the security mode complete message simultaneously.

Step S720: The SRNC uses $IK_U$ to authenticate the received security mode complete message; or uses $CK_U$ to decrypt the message first and then uses $IK_U$ to authenticate the received security mode complete message.

Step S722: If the authentication of the security mode complete message is successful, the SRNC sends a security mode complete message to the core network node, wherein the message may carry parameters: the selected integrity algorithm and/or ciphering algorithm.

Later, the UE and the Node B+ may start the ciphering/deciphering operations according to above keys.

Preferably, in the embodiment, the core network node maintains one network Next hop Chaining Counter (NCC) to count the number of times of calculating the next hop enhanced key, in order to synchronize with the key at the user side. The initial value of the network NCC is 0. When the next hop enhanced key is calculated for the first time in step S704, the value of the corresponding network NCC is 1. In the case that the core network node maintains one network NCC, the security mode command message may also carry a parameter: the network NCC. The network NCC is sent to the SRNC and received and saved by the SRNC. Similarly, the UE also maintains a terminal next hop chaining counter (NCC) to count the number of times that the UE calculates the next hop enhanced key, in order to synchronize with the key at the network side. The initial value thereof is 0. When the UE calculates the next hop enhanced key for the first time, at this point, the value of the corresponding terminal NCC is 1. In the subsequent SRNC relocation flow, when the terminal NCC is not equal to the network NCC, the UE calculates the next hop enhanced key and progressively increases the corresponding terminal NCC till the terminal NCC is equal to the network NCC, in order to keep keys used by the UE and the target RNC consistent. Synchronization of keys at the network side and the user side using the NCC effectively guarantees the consistency of keys at the network side and the user side.

Figure 8:
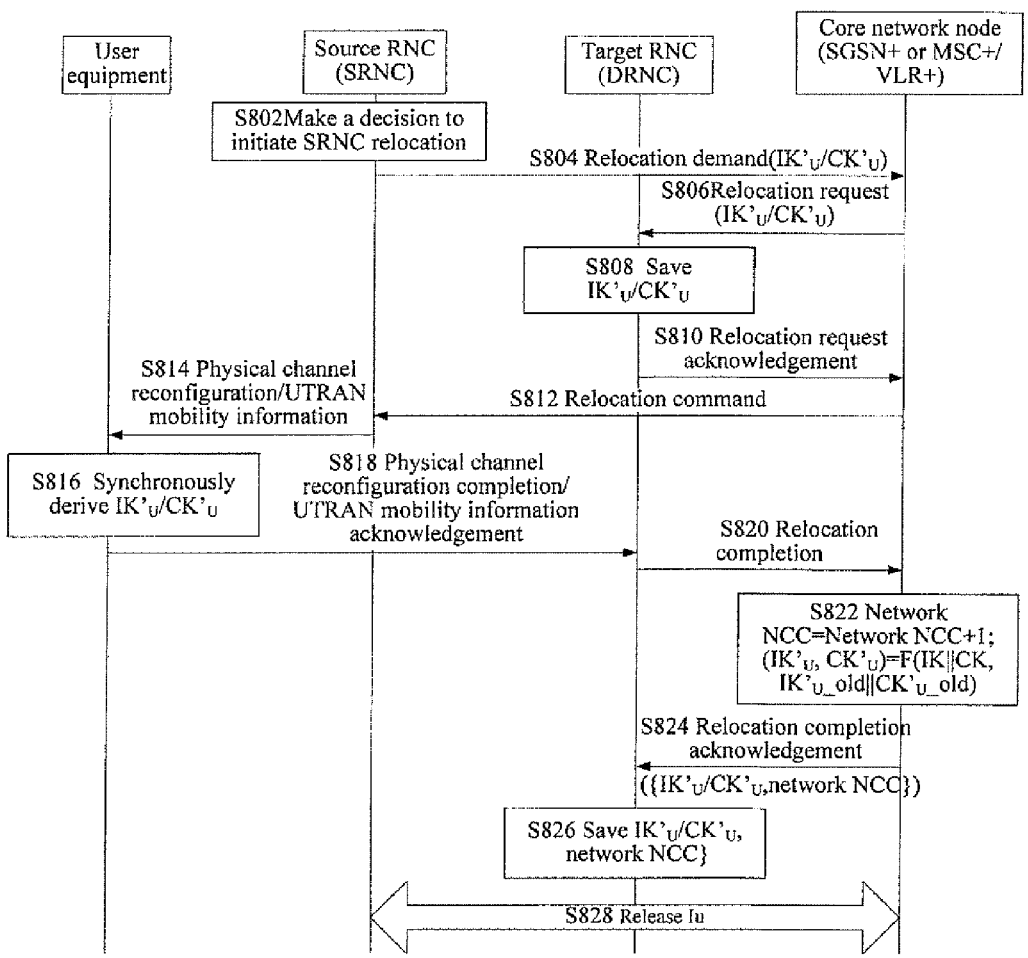
FIG. 8 shows the flowchart of updating an air interface key during SRNC concomitant relocation according to an embodiment of the disclosure.

With reference to FIG. 8, the flowchart of updating an air interface key during SRNC concomitant relocation according to an embodiment of the disclosure is shown. In the embodiment, the message interaction between the SRNC and the target RNC has to be transferred by core network node CNN+ (SGSN+ or MSC+).

The embodiment comprises the following steps.

Step S802: The source RNC (i.e., SRNC) makes a decision to initiate SRNC relocation.

The triggering condition of this decision may be: the source RNC receives a measurement report from the UE, or receives an uplink signaling transmission indication sent by the target RNC requesting cell update or URA update etc.

Step S804: The source RNC sends a relocation demand message to the core network node.

If the source RNC is connected with two CNN+ nodes simultaneously, the source RNC sends a relocation demand message to the two CNN+ nodes simultaneously. If the source RNC and the target RNC are under two different CNN+ nodes, the message needs to be transferred through the two CNN+ nodes.

The relocation demand message carries the parameters of: the next hop enhanced integrity key $IK'_U$ and/or the next hop enhanced ciphering key $CK'_U$. In addition, it may also carry one or any combination of the following parameters: the UE security capability, the ciphering algorithm supported by the user, the integrity algorithm supported by the user, the selected ciphering algorithm, the selected integrity algorithm, and the network Next hop Chaining Counter (NCC) related to the enhanced air interface key. Preferably, the above security data is carried in a transparent container from the source RNC to the target RNC.

Optionally, the source RNC uses the next hop enhanced integrity key $IK'_U$ as the enhanced integrity key $IK_U$ and the next hop enhanced ciphering key $CK'_U$ as the enhanced ciphering key $CK_U$. The relocation demand message sent by the source RNC carries the parameters of: the enhanced integrity key $IK_U$ and/or enhanced ciphering key $CK_U$.

Optionally, as it may be that the source RNC cannot determine whether the target RNC supports the enhanced security, the source RNC puts the next hop enhanced keys $IK'_U$ and $CK'_U$ in the IK and CK fields of the relocation demand message respectively.

In the practical network layout, the network entities supporting the enhanced security function and the network entities supporting only the traditional security coexist. In the SRNC relocation, there is a scene in which the UE relocates to a target RNC not supporting the enhanced security function from a SRNC+ supporting the enhanced security function. However, when the SRNC+ makes a decision to initiate relocation, it may be that the SRNC+ does not know whether the target RNC supports the enhanced security function. Therefore, in the SRNC relocation, the update of keys also needs to take the security support of the traditional network into consideration.

Step S806: The core network node sends a relocation request message to the target RNC, wherein the message carries the next hop enhanced keys $IK'_U$ and $CK'_U$ and/or the network NCC.

In the embodiment, the core network node at the network side maintains one network NCC, so that the relocation request message may also carry information about the network NCC. The information about the network NCC is sent to the target RNC to realize consistency of keys between the target RNC and the user conveniently.

In this step, the core network node puts the $CK'_U$ in the CK field of the relocation request message, and/or puts the $IK'_U$ in the IK field of the relocation request message, and sends them/it to the target RNC.

It should be noted that, during the enhanced SRNC relocation process, the source RNC may directly send a relocation request message to the target RNC. In the above, the relocation request message is called the enhanced relocation request message. The enhanced relocation request message carries the next hop enhanced integrity key $IK'_U$ and/or the next hop enhanced ciphering key $CK'_U$. The source RNC puts the next hop enhanced keys $IK'_U$ and $CK'_U$ in the IK and Ck fields of the relocation demand message respectively, and sends them to the target RNC.

Step S808: The target RNC saves the received keys. If the target RNC supports the enhanced security, the target RNC uses the value of the IK field in the received message as the enhanced key $IK_U$ and the value of CK field as the enhanced key $CK_U$. If the target RNC does not support the enhanced security, the target RNC uses the value of the IK field in the received message as the traditional key IK and the value of the CK field as the traditional key CK.

Step S810: The target RNC sends a relocation request acknowledge message to the core network node. Before sending the message, the target RNC may establish a new Iu bearer with the core network node, and assign Radio Resource Control (RRC) connection resources and resources such as radio link for the UE. If the source RNC and the target RNC are under two different CNN+ nodes (SGSN+ and/or MSC/VLR+), the message needs to be transferred through the two CNN+ nodes.

Optionally, the relocation acknowledgement message carries the information about the network NCC.

Step S812: The core network node sends a relocation command message to the source RNC.

Optionally, the relocation command message carries the information about the network NCC of the core network node.

Step S814: The source RNC sends a relocation message, i.e., a physical channel reconfiguration message or a UTRAN mobility information message, to the UE.

Optionally, the physical channel reconfiguration message or the UTRAN mobility information message carries information about the network NCC.

Step S816: If the UE supports the enhanced security, the UE updates the enhanced integrity key $IK_U$ and/or the enhanced ciphering key $CK_U$ according to the same algorithm as the network side.

In this step, the terminal NCC is set in the UE. The UE receives the network NCC, and judges whether the terminal NCC corresponding to the currently activated enhanced key is equal to the network NCC. If they are equal, the UE directly uses the enhanced integrity key $IK_U$ and/or enhanced ciphering key $CK_U$ saved in the UE. If the network NCC is greater than the terminal NCC, the UE calculates the enhanced key $IK_U/CK_U$ and progressively increases the corresponding terminal NCC till the terminal NCC is equal to the network NCC.

Step S818: The UE sends a physical channel reconfiguration complete message or a UTRAN mobility information acknowledge message to the target RNC. Integrity protection may be performed for the message using the updated integrity key $IK_U$, or both integrity protection and ciphering protection may be performed for the message simultaneously using the updated integrity key $IK_U$ and ciphering key $CK_U$.

The message may also carry the UE security capability parameter.

Step S820: The target RNC uses the updated integrity key $IK_U$ and/or ciphering key $CK_U$ to perform security authentication for the message. If the target RNC successfully authenticates the message sent by the UE, the target RNC sends a relocation complete message to the core network node (SGSN+ or MSC/VLR+), wherein the relocation complete message carries information indicating to the core network node that the relocation is completed. Optionally, the message may also carry information about the network NCC.

Step S822: The core network node calculates the next hop enhanced keys $IK'_U$ and $CK'_U$ based on the IK, CK and the current enhanced keys $IK_U$ and $CK_U$.

Optionally, if the network side maintains a network NCC, the core network node progressively increases the network NCC before or after calculating the next hop enhanced keys $IK'_U$ and $CK'_U$.

Step S824: The core network node sends a relocation complete acknowledge message to the target RNC, wherein the relocation complete acknowledge message carries the next hop enhanced keys $IK'_U$ and $CK'_U$ and/or the related network NCC.

Step S826: The target RNC saves the received next hop enhanced keys $IK'_U$ and $CK'_U$ and/or the related network NCC for later use in the next SRNC relocation.

Step S828: The core network node (SGSN+ or MSC/VLR+) releases the Iu interface with the source RNC.

Similarly, the security operations in the embodiment as shown in FIG. 8 are applicable to the enhanced SRNC relocation flow. In the enhanced SRNC relocation flow, the source RNC and the target RNC directly communicate with each other, and transferring through the core network nodes is not needed. Messages in step S804 and step S806 in FIG. 8 are replaced with the enhanced relocation request message sent by the source RNC to the target RNC. Messages in step S810 and step S812 in FIG. 8 are replaced with the enhanced relocation response message sent by the target RNC to the source RNC. Messages in step S820 and step S824 in FIG. 8 are replaced with the enhanced relocation complete request message and the enhanced relocation complete response message between the target RNC and the core network node respectively. Other than the above, parameters carried in the messages and operations in other steps are completely identical, which will not be described again herein.

If the core network node sends the next hop enhanced key to the SRNC during the initialization, when the UE performs the first SRNC relocation flow, the above key update flow may be employed. If the core network node does not send the next hop enhanced key to the SRNC during the initialization, when the UE performs the SRNC relocation flow for the first time, the security operations for SRNC relocation defined in the traditional UMTS are followed. That is, the source RNC sends the currently used enhanced key $IK_U$ and/or $CK_U$ to the target RNC, and the UE and the target RNC directly use the current enhanced key. When the UE performs the second SRNC relocation, the above key update flow is then employed.

After an SRNC relocation flow is completed successfully, the target RNC may initiate an intra-SRNC relocation. In the above, the source RNC and the target RNC are the same SRNC, thereby achieving the purpose of guaranteeing the forward security.

Figure 9:
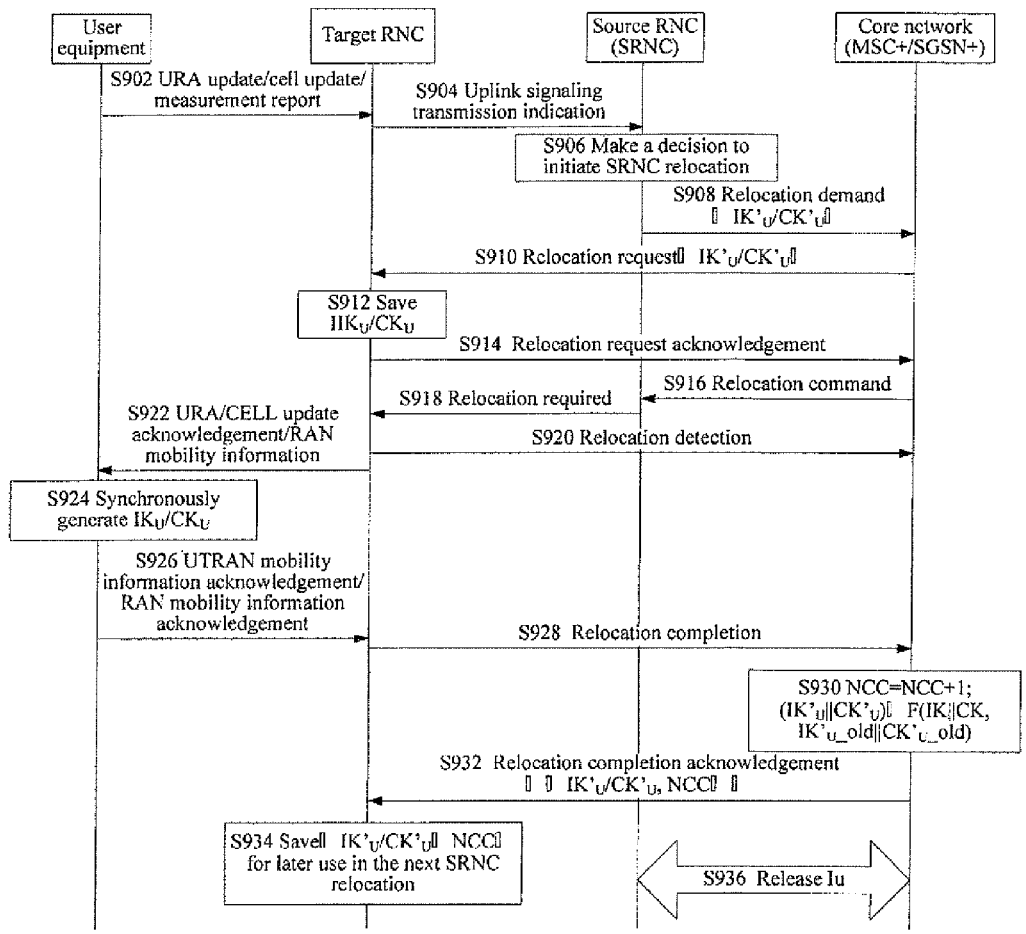
FIG. 9 shows the flowchart of updating an air interface key during SRNC static relocation according to an embodiment of the disclosure.

With reference to FIG. 9, the flowchart of updating an air interface key during SRNC static relocation according to an embodiment of the disclosure is shown. The embodiment employs the traditional SRNC relocation flow, i.e., a flow in which the message interaction between the SRNC and the target RNC is transferred through the core network node. It should be noted that the security operations in the embodiment are similarly applicable to the enhanced SRNC concomitant relocation flow. That is, the message interaction between the SRNC and the target RNC is performed directly, and transferring through the core network nodes is not needed.

The embodiment may comprise the following steps.

Step S902: The UE sends a URA update message or a cell update message or a measurement report message to the UTRAN.

Step S904: The target RNC sends an uplink signaling transmission indication message to the source RNC of the UE by receiving the URA update message or the cell update message or the measurement report message from the UE.

Step S906: The source RNC (i.e., SRNC) makes a decision to initiate SRNC relocation.

Step S908: The source RNC sends a relocation demand message to the core network node, wherein the relocation demand message carries the next hop enhanced keys $IK'_U$ and $CK'_U$, and the message may also carry the network NCC.

Step S910: The core network node sends a relocation request message to the target RNC, wherein the relocation request message carries the next hop enhanced keys $IK'_U$ and $CK'_U$, and/or network NCC.

In the embodiment, the core network node at the network side maintains a network NCC, so that the relocation request message may also carry information about the network NCC.

Step S912: The target RNC saves the received keys.

Step S914: The target RNC sends a relocation request acknowledge message to the core network node. Before sending the message, the target RNC may establish a new Iu bearer with the core network node, and assign Radio Resource Control (RRC) connection resources and resources such as radio link for the UE.

Optionally, the relocation acknowledgement message carries information about the network NCC.

Step S916: The core network node sends a relocation command message to the source RNC.

Optionally, the relocation command message carries information about the network NCC of the core network node.

Step S918: The source RNC sends a relocation required message to the target RNC.

Step S920: The target RNC sends a relocation detection message to the core network node.

Step S922: The target RNC sends a cell update acknowledge message or a URA update acknowledge message or a RAN mobility information message to the UE, wherein the message carries the indication information of the security capability of the target RNC.

Optionally, the above message carries information about the network NCC.

Step S924: If the UE supports the enhanced security, the UE updates the enhanced integrity key $IK_U$ and/or ciphering key $CK_U$ according to the same algorithm as the network side.

In this step, the terminal NCC is set in the UE. The UE receives the network NCC, and judges whether the terminal NCC corresponding to the currently activated enhanced key is equal to the network NCC. If they are equal, the UE directly uses the enhanced integrity key $IK_U$ and/or enhanced ciphering key $CK_U$ saved in the UE. If the network NCC is greater than the terminal NCC, the UE calculates the enhanced key $IK_U/CK_U$ and progressively increases the corresponding terminal NCC till the terminal NCC is equal to the network NCC.

Step S926: The UE sends a UTRAN mobility information acknowledge message or a RAN mobility information acknowledge message to the target RNC. Integrity protection may be performed for the message using the updated integrity key $IK_U$, or both integrity protection and ciphering protection may be performed for the message simultaneously using the updated integrity key $IK_U$ and ciphering key $CK_U$.

The message may also carry the UE security capability parameter,

Step S928: The target RNC uses the updated integrity key $IK_U$ and/or ciphering key $CK_U$ to perform security authentication for the message. If the target RNC successfully authenticates the message sent by the UE, the target RNC sends a relocation complete message to the core network node (SGSN+ or MSC/VLR+), wherein the relocation complete message carries information indicating to the core network node that the relocation is completed, and the message may also carry information about the network NCC.

Step S930: The core network node calculates the next hop enhanced keys $IK'_U$ and $CK'_U$ based on the IK, CK and the current enhanced keys $IK_U$ and $CK_U$.

Optionally, if the network side maintains a network NCC, the core network node progressively increases the network NCC before or after calculating the next hop enhanced keys $IK'_U$ and $CK'_U$.

Step S932: The core network node sends a relocation complete acknowledge message to the target RNC, wherein the relocation complete acknowledge message carries the next hop enhanced keys $IK'_U$ and $CK'_U$ and/or the related network NCC.

Step S934: The target RNC saves the received next hop enhanced keys $IK'_U$ and $CK'_U$ and/or the related network NCC for later use in the next SRNC relocation.

Step S936: The core network node (SGSN+ or MSC/VLR+) releases the Iu interface with the source RNC.

The step that the core network node (SGSN+ or MSC/VLR+) releases the Iu interface with the source RNC may also be performed before step S930.

It should be noted that, all the above embodiments are also applicable to intra-SRNC relocation, i.e., a scene in which the source RNC and the target RNC are the same RNC.

Figure 10:
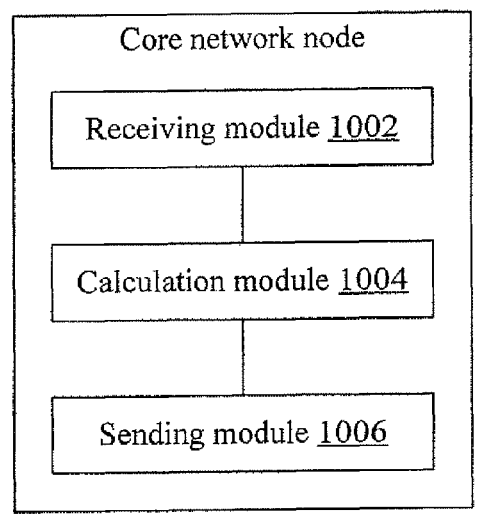
FIG. 10 shows the structure block diagram of a core network node according to an embodiment of the disclosure.

With reference to FIG. 10, a structure block diagram of a core network node according to an embodiment of the disclosure is shown, comprising:

a receiving module 1002, configured to receive a relocation complete indication message from a target RNC, wherein the relocation complete indication message is configured to indicate the successful relocation of the UE from a source RNC to the target RNC; a calculation module 1004, configured to, after the receiving module 1002 receives the relocation complete indication message, use the saved traditional key and the current enhanced key to calculate a next hop enhanced key; and a sending module 1006, configured to send the next hop enhanced key to the target RNC.

Preferably, the core network node in the embodiment may also comprise: a network NCC, configured to count the number of times that the core network node calculates a next hop enhanced key.

Preferably, the receiving module 1002 is further configured to, before receiving a relocation complete indication message from the target RNC, receive a relocation demand message sent by the source RNC, wherein the relocation demand message comprises the next hop $CK'_U$ and/or $IK'_U$ of the source RNC; and the sending module 1006 is further configured to send a relocation request message to the target RNC, wherein the relocation request message comprises the next hop $CK'_U$ and/or $IK'_U$ sent by the source RNC.

Figure 11:
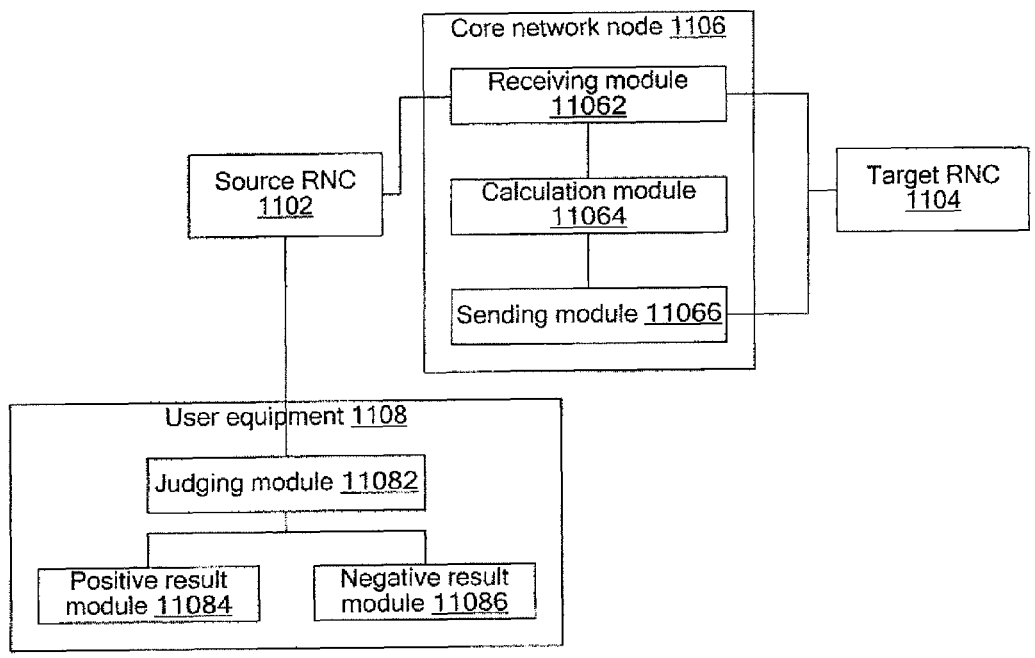
FIG. 11 shows the structure block diagram of a radio access system according to an embodiment of the disclosure.

With reference to FIG. 11, the structure block diagram of a radio access system according to an embodiment of the disclosure is shown, comprising: a source RNC 1102, a target RNC 1104, a core network node 1106 and a UE 1108.

In the above, the source RNC 1102 is configured to send a relocation demand message to the core network node 1106, wherein the relocation demand message carries the next hop enhanced key of the source RNC 1102; and receive a relocation command from the core network node 1106 and send a relocation message to the UE 1108.

In the above, the target RNC 1104 is configured to receive a relocation request message sent by the core network node 1106, wherein the relocation request message carries a next hop enhanced key sent by the source RNC 1102; and send a relocation complete indication message to the core network node 1106, and receive a relocation complete acknowledge message from the core network node 1106, wherein the relocation complete acknowledge message comprises a next hop enhanced key of the target RNC 1104.

In the above, the core network node 1106 is configured to receive the relocation complete indication message from the target RNC 1104, calculate a next hop enhanced key, and send the relocation complete acknowledge message to the target RNC 1104.

In the above, the UE 1108 is configured to synchronize its own enhanced key according to a relocation message sent by the source RNC 1102.

Preferably, the core network node 1106 comprises: a receiving module 11062, configured to receive a relocation complete indication message from a target RNC 1104, wherein the relocation complete indication message is configured to indicate the successful relocation of the UE 1108 from the source RNC 1102 to the target RNC 1104; a calculation module 11064, configured to, after the receiving module 11062 receives the relocation complete indication message, use the saved traditional key and the current enhanced key to calculate a next hop enhanced key; and a sending module 11066, configured to send the next hop enhanced key to the target RNC 1104.

Preferably, the core network node 1106 further comprises: a network NCC, configured to count the number of times that the core network node 1106 calculates the next hop enhanced key.

Preferably, the UE 1108 comprises: a terminal NCC, configured to count the number of times that the UE 1108 calculates the next hop enhanced key.

Preferably, the UE 1108 further comprises: a judging module 11082, configured to judge whether the terminal NCC is equal to the network NCC; a positive result module 11084, configured to, if the result of the judgment of the judging module 11082 is yes, use the $CK_U$ and/or $IK_U$ which is saved in advance and is corresponding to the terminal NCC; and a negative result module 11086, configured to, if the result of the judgment of the judging module 11082 is no, calculate the $CK_U$ and/or $IK_U$, and progressively increase the corresponding terminal NCC till the terminal NCC is equal to the network NCC.

Figure 12:
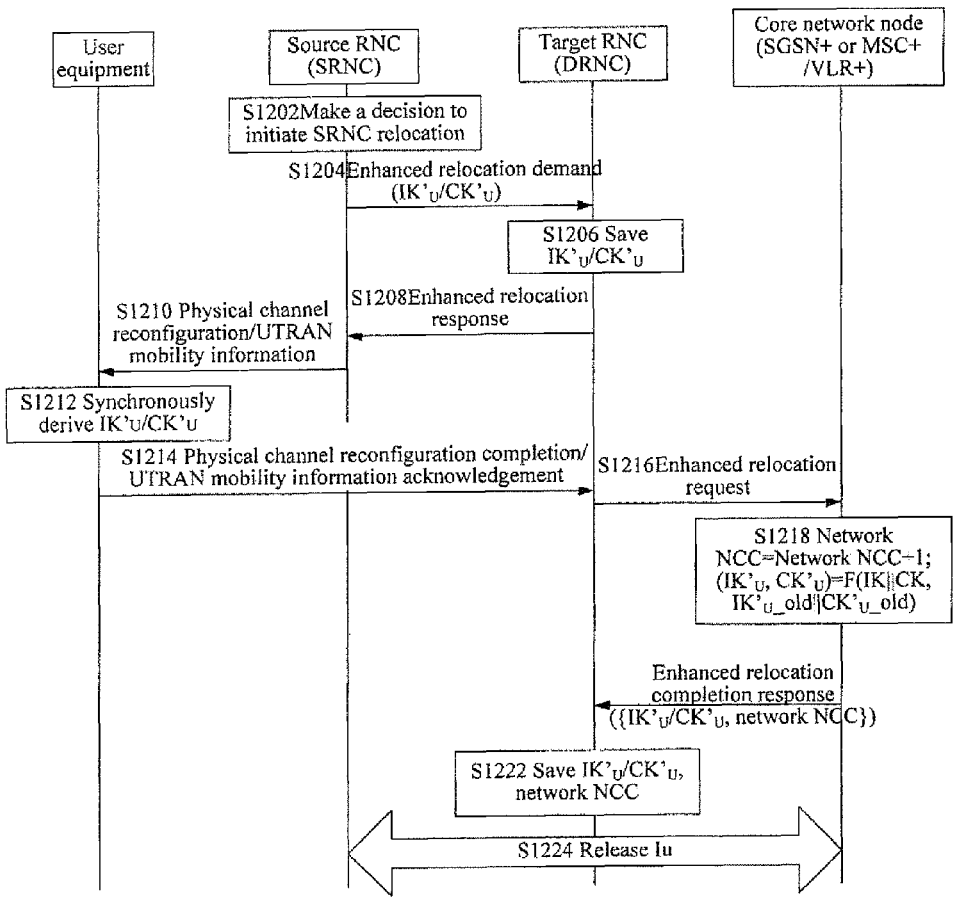
FIG. 12 shows another flowchart of updating an air interface key during SRNC concomitant relocation according to an embodiment of the disclosure.

With reference to FIG. 12, the flowchart of updating an air interface key during SRNC concomitant relocation according to an embodiment of the disclosure is shown. In the embodiment, the message interaction between the SRNC and the target RNC needs no transfer of core network nodes CNN+ (SGSN+ or MSC+), and the enhanced SRNS relocation flow is employed.

The embodiment comprises the following steps.

Step S1202: The source RNC (i.e., SRNC) makes a decision to initiate SRNC relocation.

The triggering condition of this decision may be: the source RNC receives a measurement report from the UE, or receives an uplink signaling transmission indication sent by the target RNC requesting cell update or URA update etc.

Step S1204: The source RNC sends an enhanced relocation request message to the target RNC, wherein the enhanced relocation request message carries the next hop enhanced keys $IK'_U$ and $CK'_U$ and/or the network NCC.

The enhanced relocation request message carries the parameters of: the next hop enhanced key $IK'_U$ and/or the next hop enhanced key $CK'_U$. In addition, it may also carry one or any combination of the following parameters: the UE security capability, the ciphering algorithm supported by the user, the integrity algorithm supported by the user, the selected ciphering algorithm, the selected integrity algorithm, and the network NCC related to the enhanced air interface key. Preferably, above security data is carried in a transparent container from the source RNC to the target RNC.

Optionally, the source RNC takes the next hop enhanced integrity key $IK'_U$ as the enhanced integrity key $IK_U$ and the next hop enhanced ciphering key $CK'_U$ as the enhanced ciphering key $CK_U$. The relocation demand message sent by the source RNC carries parameters: the enhanced integrity key $IK_U$ and/or the enhanced ciphering key $CK_U$.

Optionally, as it may be that the source RNC cannot determine whether the target RNC supports the enhanced security, the source RNC respectively puts the next hop enhanced keys $IK'_U$ and $CK'_U$ in the IK and CK fields of the enhanced relocation demand message.

In the practical network layout, the network entities supporting the enhanced security function and the network entities supporting only the traditional security coexist. In the SRNC relocation, there is a scene in which the UE relocates to a target RNC not supporting the enhanced security function from a SRNC+ supporting the enhanced security function. However, when the SRNC+ makes a decision to initiate relocation, it may be that the SRNC+ does not know whether the target RNC supports the enhanced security function. Therefore, in the SRNC relocation, the update of keys also needs to take the security support of the traditional network into consideration.

Step S1206: The target RNC saves the received keys. If the target RNC supports the enhanced security, the target RNC takes the value of the IK field in the received message as the enhanced key $IK_U$ and the value of CK field as the enhanced key $CK_U$. If the target RNC does not support the enhanced security, the target RNC takes the value of the IK field in the received message as the traditional key IK and the value of the CK field as the traditional key CK.

Step S1208: The target RNC sends an enhanced relocation response message to the source RNC. Before sending the message, the target RNC assigns RRC connection resources and resources such as radio link for the UE.

Optionally, the enhanced relocation response message carries information about the network NCC.

Step S1210: The source RNC sends a relocation message, i.e., a physical channel reconfiguration message or a UTRAN mobility information message, to the UE.

Optionally, the physical channel reconfiguration message or the UTRAN mobility information message carries information about the network NCC.

Step S1212: If the UE supports the enhanced security, the UE updates the enhanced integrity key $IK_U$ and/or the enhanced ciphering key $CK_U$ according to the same algorithm as the network side.

In this step, the terminal NCC is set in the UE. The UE receives the network NCC, and judges whether the terminal NCC corresponding to the currently activated enhanced key is equal to the network NCC. If they are equal, the UE directly uses the enhanced integrity key $IK_U$ and/or enhanced ciphering key $CK_U$ saved in the UE. If the network NCC is greater than the terminal NCC, the UE calculates the enhanced key $IK_U/CK_U$ and progressively increases the corresponding terminal NCC till the terminal NCC is equal to the network NCC.

Step S1214: The UE sends a physical channel reconfiguration complete message or a UTRAN mobility information acknowledge message to the target RNC. Integrity protection may be performed for the message using the updated integrity key $IK_U$, or both integrity protection and ciphering protection may be performed for the message simultaneously using the updated integrity key $IK_U$ and ciphering key $CK_U$.

The message may also carry the UE security capability parameter.

Step S1216: The target RNC uses the updated integrity key $IK_U$ and/or ciphering key $CK_U$ to perform security authentication for the message. If the target RNC successfully authenticates the message sent by the UE, the target RNC sends a relocation complete message to the core network node (SGSN+ or MSC/VLR+), wherein the relocation complete message carries information indicating to the core network node that the relocation is completed. Optionally, the message may also carry information about the network NCC.

Step S1218: The core network node calculates the next hop enhanced keys $IK'_U$ and $CK'_U$ based on the IK, CK and the current enhanced keys $IK_U$ and $CK_U$.

Optionally, if the network side maintains a network NCC, the core network node progressively increases the network NCC before or after calculating the next hop enhanced keys $IK'_U$ and $CK'_U$.

Step S1220: The core network node sends a relocation complete request message to the target RNC, wherein the relocation complete request message carries the next hop enhanced keys $IK'_U$ and $CK'_U$ and/or the related network NCC.

Step S1222: The target RNC saves the received next hop enhanced keys $IK'_U$ and $CK'_U$ and/or the related network NCC for later use in the next SRNC relocation.

Step S1224: The core network node (SGSN+ or MSC/VLR+) releases the Iu interface with the source RNC.

Obviously, those skilled in the art should understand that the above modules or steps of the disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices. Under certain situation, the shown or described steps can be executed according to an order different from the above order, or they can be achieved by respectively making them into many integrated circuit modules or by making multiple modules or steps among them into a single integrated circuit module. In this way, the disclosure is not limited to combinations of any specific hardware and software.

The above contents are only preferred embodiments of the disclosure and should not be used for limiting the disclosure. For those skilled in the art, the disclosure may have various alternations and changes. Any modifications, equivalent replacements and improvements within the spirit and principle of the disclosure should be contained within the protection scope of the disclosure.

What is claimed is:

1. A method for updating an air interface key, comprising:
a core network node receiving a relocation complete indication message from a target Radio Network Controller (RNC), wherein the relocation complete indication message is configured to indicate successful relocation of a User Equipment (UE) from a source RNC to the target RNC;
using a saved traditional key and a current enhanced key to calculate a next hop enhanced key; and
sending the next hop enhanced key to the target RNC;
wherein the traditional key comprises a traditional integrity key IK and/or a traditional ciphering key CK, and the enhanced key comprises an enhanced integrity key $IK_U$ and/or an enhanced ciphering key $CK_U$;
wherein a network Next hop Chaining Counter (NCC) is set in the core network node to count number of times that the core network node calculates the next hop enhanced key;
wherein before the step that the core network node receives the relocation complete indication message from the target RNC, the method further comprises: the source RNC sending a relocation demand message to the core network node, wherein the relocation demand message comprises a next hop $CK_U$ and/or a next hop $IK_U$ sent by the source RNC; and the core network node receiving the relocation demand message and sending a relocation request message to the target RNC, wherein the relocation request message comprises the next hop $CK_U$ and/or the next hop $IK_U$ sent by the source RNC;
wherein the step that the source RNC sends the relocation demand message to the core network node comprises: the source RNC putting the next hop $IK_U$ in an IK field of the relocation demand message, and/or putting the next hop $CK_U$ in a CK field of the relocation demand message, and sending them/it to the core network node; and
wherein the step that the core network node sends the relocation request message to the target RNC comprises: the core network node putting the next hop $IK_U$ sent by the source RNC in an IK field of the relocation request message, and/or putting the next hop $CK_U$ sent by the source RNC in a CK field of the relocation request message, and sending them/it to the target RNC.

2. The method according to claim 1, wherein both the relocation demand message and the relocation request message comprise information indicated by the network NCC.

3. The method according to claim 1, after the step that the core network node sends the relocation request message/the enhanced relocation request message to the target RNC, further comprising:

if the target RNC does not support an enhanced security mode, the content in the CK field of the relocation request message/the enhanced relocation request message is taken as the CK and the content in the IK field of the relocation request message/the enhanced relocation request message is taken as the IK; and if the target RNC supports the enhanced safe mode, the content in the CK field of the relocation request message/the enhanced relocation request message is taken as the CKU and the content in the IK field of the relocation request message/the enhanced relocation request message is taken as the IKU.

4. The method according to claim 1, after the step that the core network node sends the relocation request message to the target RNC, further comprising:

the core network node receiving a relocation request acknowledge message from the target RNC and sending a relocation command message to the source RNC, wherein the relocation command message comprises information indicated by the network NCC; and the source RNC receiving the relocation command message and sending a relocation message to the UE, wherein the relocation message comprises information indicated by the network NCC.

5. The method according to claim 4, after the step that the source RNC receives the relocation command message and sends the relocation message to the UE, further comprising:

the UE receiving the relocation message, and judging whether a terminal NCC corresponding to a currently activated enhanced key is equal to the network NCC;

if yes, the UE using the $IK_U$ and/or the $CK_U$ which is saved in advance and is corresponding to the terminal NCC; and if not, the UE calculating the $IK_U$ and/or the $CK_U$ and increasing the corresponding terminal NCC, till the terminal NCC is equal to the network NCC.

6. The method according to claim 1, further comprising:

the core network node calculating the current enhanced key according to the saved traditional key, when the UE is attached to the network for a first time, or when the UE switches to the connected mode from the idle mode, or when the UE moves into the Universal Terrestrial Radio Access Network (UTRAN) from the Evolved Universal Terrestrial Radio Access Network (E-UTRAN) or Global System for Mobile Communication (GSM), or when the UE moves into the enhanced UTRAN from the traditional UTRAN; and the core network node sending the current enhanced key and/or a calculated initial next hop enhanced key to a serving RNC.

7. The method according to claim 6, wherein the initial next hop enhanced key is calculated by the core network node according to the saved traditional key and the calculated current enhanced key through formula of:

$(IK_U, CK_U) = F1 (IK \| CK, \text{Parameter})$;
$(IK'_U, CK'_U) = F2 (IK \| CK, IK_U \| CK_U)$;

wherein F1 and F2 are key functions, IK is a traditional integrity key, CK is a traditional ciphering key, $IK_U$ is a current enhanced integrity key, $CK_U$ is a current enhanced ciphering key, $IK'_U$ is an initial next hop enhanced integrity key, $CK'_U$ is an initial next hop enhanced ciphering key, symbol "$\|$" represents a concatenation operation, and Parameter is a parameter.

8. The method according to claim 6, after the step that the core network node sends the current enhanced key and/or the calculated initial next hop enhanced key to the serving RNC, further comprising:

the serving RNC receiving and saving the current enhanced key and/or the calculated initial next hop enhanced key, and sending a security mode command message to the UE; and the UE receiving the security mode command message and using the saved traditional key to calculate the enhanced key.

9. The method according to claim 8, after the step that the UE receives the security mode command message and uses the saved traditional key to calculate the enhanced key, further comprising:

the UE using the traditional key and the enhanced key to calculate the next hop enhanced key.

10. A core network node, comprising a hardware processor configured to execute program units stored on a memory, the program units comprising:

a receiving module, configured to receive a relocation complete indication message from a target Radio Network Controller (RNC), wherein the relocation complete indication message is configured to indicate successful relocation of a User Equipment (UE) from a source RNC to the target RNC;

a calculation module, configured to, after the receiving module receives the relocation complete indication message, use a saved traditional key and a current enhanced key to calculate a next hop enhanced key; and a sending module, configured to send the next hop enhanced key to the target RNC;

a network Next hop Chaining Counter (NCC), configured to count number of times that the core network node calculates the next hop enhanced key;

wherein the receiving module is further configured to, before receiving the relocation complete indication message from the target RNC, receive a relocation demand message sent by the source RNC, wherein the relocation demand message comprises a next hop $CK_U$ and/or a next hop $IK_U$ of the source RNC; and the sending module is further configured to send a relocation request message to the target RNC, wherein the relocation request message comprises the next hop $CK_U$ and/or the next hop $IK_U$ sent by the source RNC.

11. A radio access system, comprising a source Radio Network Controller (RNC), a target RNC, a core network node and a User Equipment (UE), wherein the source RNC is configured to send a relocation demand message to the core network node, wherein the relocation demand message carries a next hop enhanced key of the source RNC; receive a relocation command from the core network node; and send a relocation message to the UE;

the target RNC is configured to receive a relocation request message sent by the core network node, wherein the relocation request message carries the next hop enhanced key sent by the source RNC; send a relocation complete indication message to the core network node; and receive a relocation complete acknowledge message from the core network node, wherein the relocation complete acknowledge message comprises a next hop enhanced key of the target RNC;

the core network node is configured to receive the relocation complete indication message from the target RNC, and calculate a next hop enhanced key and send the next hop enhanced key to the target RNC by the relocation complete acknowledge message; and the UE is configured to synchronize enhanced key of the UE according to the relocation message sent by the source RNC, wherein the core network node comprises a first hardware processor configured to execute first program units stored on a memory, the first program units comprising: a receiving module; configured to receive the relocation complete indication message from the target RNC, wherein the relocation complete indication message is configured to indicate successful relocation of the UE from the source RNC to the target RNC; a calculation module, configured to, after the receiving module receives the relocation complete indication message, use a saved traditional key and a current enhanced key to calculate the next hop enhanced key; and a sending module, configured to send the next hop enhanced key to the target RNC;

wherein the first program units further comprise: a network Next hop Chaining Counter (NCC), configured to count number of times that the core network node calculates the next hop enhanced key; and the UE comprises a second hardware processor configured to execute second program units stored on a memory, the second program units comprising: a terminal NCC, configured to count number of times that the UE calculates the next hop enhanced key.

12. The radio access system according to claim 11, wherein the second program units further comprises:

a judging module, configured to judge whether the terminal NCC is equal to the network NCC;

a positive result module, configured to, if the result of the judgment of the judging module is yes, use a $CK_U$ and/or a $IK_U$ which is saved in advance and is corresponding to the terminal NCC; and a negative result module, configured to, if the result of the judgment of the judging module is no, calculate the $CK_U$ and/or the $IK_U$, and progressively increase the corresponding terminal NCC till the terminal NCC is equal to the network NCC.

13. A method for updating an air interface key, comprising:

a core network node receiving a relocation complete indication message from a target Radio Network Controller (RNC), wherein the relocation complete indication message is configured to indicate successful relocation of a User Equipment (UE) from a source RNC to the target RNC;

using a saved traditional key and a current enhanced key to calculate a next hop enhanced key; and sending the next hop enhanced key to the target RNC;

wherein the traditional key comprises a traditional integrity key IK and/or a traditional ciphering key CK, and the enhanced key comprises an enhanced integrity key $IK_U$ and/or an enhanced ciphering key $CK_U$;

wherein a network Next hop Chaining Counter (NCC) is set in the core network node to count number of times that the core network node calculates the next hop enhanced key;

wherein before the step that the core network node receives the relocation complete indication message from the target RNC, the method comprises: the source RNC sending an enhanced relocation request message to the target RNC, wherein the enhanced relocation request message comprises the next hop $CK_U$ and/or the next hop $IK_U$ of the source RNC;

wherein the step that the source RNC sends the enhanced relocation request message to the target RNC comprises: the source RNC putting the next hop $IK_U$ in an IK field of the enhanced relocation request message, and/or putting the next hop $CK_U$ in a CK field of the enhanced relocation request message, and sending them/it to the target RNC.

14. The method according to claim 13, further comprising:

the core network node calculating the current enhanced key according to the saved traditional key, when the UE is attached to the network for a first time, or when the UE switches to the connected mode from the idle mode, or when the UE moves into the Universal Terrestrial Radio Access Network (UTRAN) from the Evolved Universal Terrestrial Radio Access Network (E-UTRAN) or Global System for Mobile Communication (GSM), or when the UE moves into the enhanced UTRAN from the traditional UTRAN; and the core network node sending the current enhanced key and/or a calculated initial next hop enhanced key to a serving RNC.

15. The method according to claim 14, wherein the initial next hop enhanced key is calculated by the core network node according to the saved traditional key and the calculated current enhanced key through formula of:

$(IK_U, CK_U)=F1 (IK\|CK, Parameter)$;
$(IK'_U, CK'_U)=F2 (IK\|CK, IK_U\|CK_U)$;

wherein F1 and F2 are key functions, IK is a traditional integrity key, CK is a traditional ciphering key, $IK_U$ is a current enhanced integrity key, $CK_U$ is a current enhanced ciphering key, $IK'_U$ is an initial next hop enhanced integrity key, $CK'_U$ is an initial next hop enhanced ciphering key, symbol "$\|$" represents a concatenation operation, and Parameter is a parameter.

16. The method according to claim 14, after the step that the core network node sends the current enhanced key and/or the calculated initial next hop enhanced key to the serving RNC, further comprising:

the serving RNC receiving and saving the current enhanced key and/or the calculated initial next hop enhanced key, and sending a security mode command message to the UE; and the UE receiving the security mode command message and using the saved traditional key to calculate the enhanced key.

17. The method according to claim 16, after the step that the UE receives the security mode command message and uses the saved traditional key to calculate the enhanced key, further comprising:

the UE using the traditional key and the enhanced key to calculate the next hop enhanced key.

* * * * *